Figure 3:
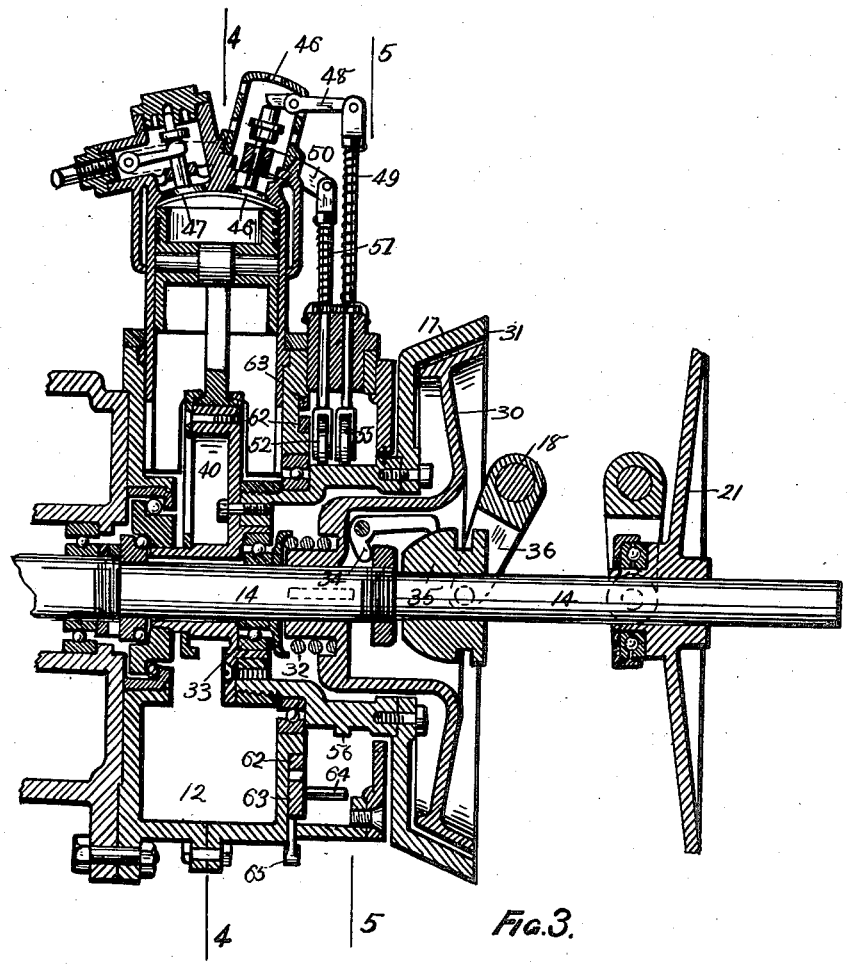

A. E. W. FINCH.
LIVE AXLE AND SHAFT WITH VARIABLE LOADS USABLE AS A BRAKE AND ALSO AS AUXILIARY DRIVING POWER THEREFOR.
APPLICATION FILED JUNE 4, 1912.
1,059,533.
Patented Apr. 22, 1913.
6 SHEETS—SHEET 1.
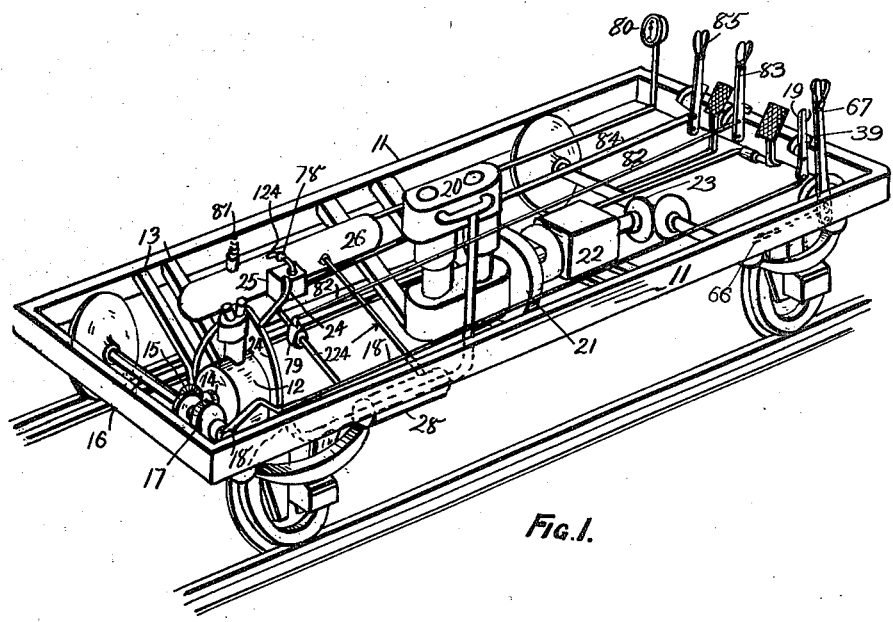
Fig.1.
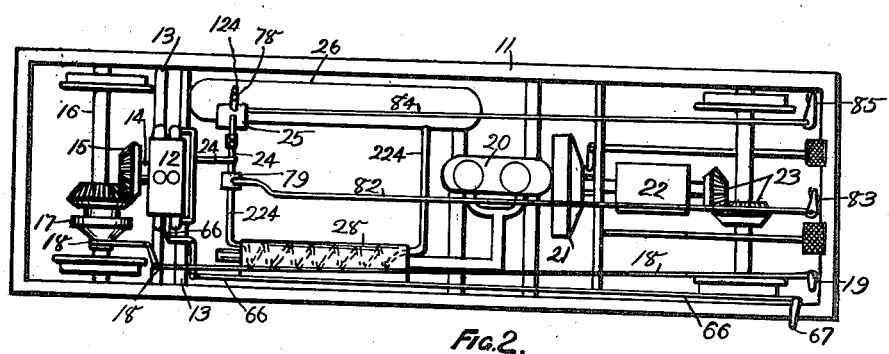
Fig.2.
WITNESSES:
INVENTOR
Albert Ernest Wilford Finch
BY
ATTY.

A. E. W. FINCH.
LIVE AXLE AND SHAFT WITH VARIABLE LOADS USABLE AS A BRAKE AND ALSO AS AUXILIARY DRIVING POWER THEREFOR.
APPLICATION FILED JUNE 4, 1912.

1,059,533.

Patented Apr. 22, 1913.

A. E. W. FINCH.
LIVE AXLE AND SHAFT WITH VARIABLE LOADS USABLE AS A BRAKE AND ALSO AS AUXILIARY DRIVING POWER THEREFOR.
APPLICATION FILED JUNE 4, 1912.

1,059,533.

Patented Apr. 22, 1913.

6 SHEETS—SHEET 3.

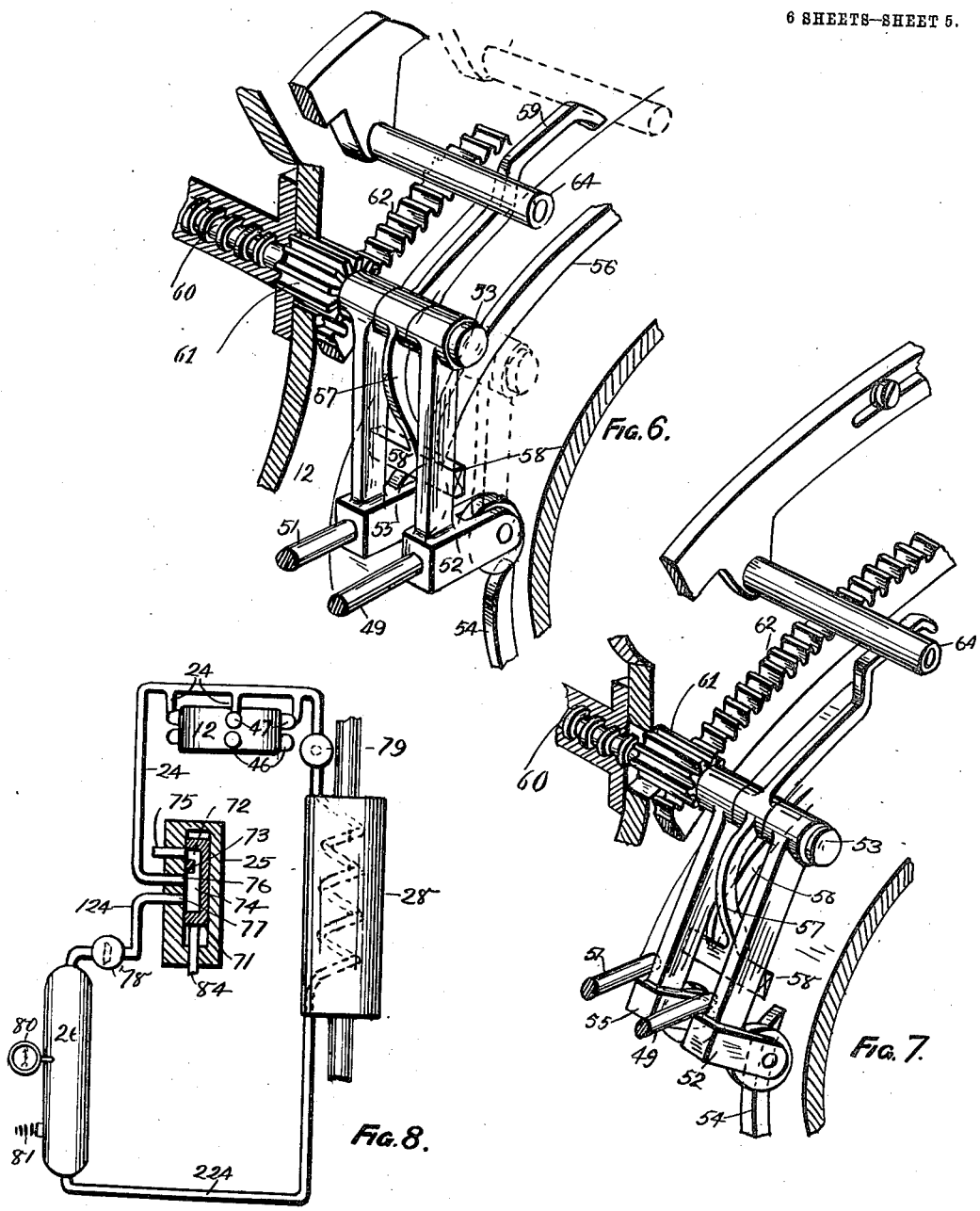

A. E. W. FINCH.
LIVE AXLE AND SHAFT WITH VARIABLE LOADS USABLE AS A BRAKE AND ALSO AS AUXILIARY DRIVING POWER THEREFOR.
APPLICATION FILED JUNE 4, 1912.

1,059,533.

Patented Apr. 22, 1913.

6 SHEETS—SHEET 6.

WITNESSES:
John C. Sanders
Albert F. Houman

INVENTOR:
Albert Ernest Wilford Finch
BY
ATTY.

UNITED STATES PATENT OFFICE.

ALBERT ERNEST WILFORD FINCH, OF KENSINGTON, NEAR SYDNEY, NEW SOUTH WALES, AUSTRALIA, ASSIGNOR OF ONE-HALF TO JAMES CHANNON, OF HORNSBY, NEAR SYDNEY, AUSTRALIA.

LIVE AXLE AND SHAFT WITH VARIABLE LOADS USABLE AS A BRAKE AND ALSO AS AUXILIARY DRIVING POWER THEREFOR.

1,059,533.      Specification of Letters Patent.      Patented Apr. 22, 1913.

Application filed June 4, 1912. Serial No. 701,539.

*To all whom it may concern:*

Be it known that I, ALBERT ERNEST WILFORD FINCH, a subject of the King of Great Britain, residing at "Myee," Doncaster avenue, Kensington, near Sydney, in the State of New South Wales and Commonwealth of Australia, clerk, have invented new and useful Improvements Relating to Live Axles and Shafts with Variable Loads Usable as a Brake and Also as Auxiliary Driving Power Therefor, of which the following is a specification.

This invention relates to live axles and shafts with variable loads such as those of automobiles, trains, trams, lifts and the like which sometimes with light loads attain excess momentum and require braking and which also have to carry a heavy load at other times. And these improvements have been specially devised to provide a pressure brake on the live axle or shaft combined with an air compressor capable of operating as an auxiliary motor and of providing power for said auxiliary motor and for various other purposes as for starting the main engine inflating tires and cooling which operations are specially useful in automobiles.

These improvements in live axles and shafts with variable loads usable as a brake and also as auxiliary driving power therefor comprise a pressure cylinder (or cylinders) having a piston operated by said live axle or by a shaft gearing therefrom, a storage reservoir to receive the pressure from behind the said cylinders and peculiar valve mechanisms and combinations of mechanical devices as and for the purposes hereinafter particularly described and explained.

The brake and compressor cylinders are positioned on or in a casing about the live axle or a driving shaft and they have a slide valve and control thereof and a pipe or pipes leading to the atmosphere and to a storage reservoir conveniently placed near by with a suitable non-return valve between. By means of said slide valve the air reservoir is convertible from a receiver into a supplier and oppositely at will. From the storage reservoir another pipe leads back to the compressor cylinders said pipe preferably passing through a heating chamber (as the silencer of an automobile, &c.) and it also has a suitable valve or cut off say controlled by a hand. The compressor has preferably three equidistant cylinders with intake and outlet valves operated by suitable cams and levers from a cam drum on the live axle or driving shaft. The pistons have suitable connecting rods attached to an eccentric which is integral with or made fast on said live axle or a clutch member fast thereon.

These improvements though applicable to any live axles or shafts may be structurally modified to be applied to railway or road automobiles, tram cars, lifts, winches, inclined ways and such like. But in order that this invention may be the more easily understood these improvements relating to live axles and shafts with variable loads usable as a brake and also as auxiliary driving power therefor will now be described with reference to the drawings accompanying and forming part of this complete specification which illustrate the best known manner they may be applied to railway and road automobiles.

Figure 4:
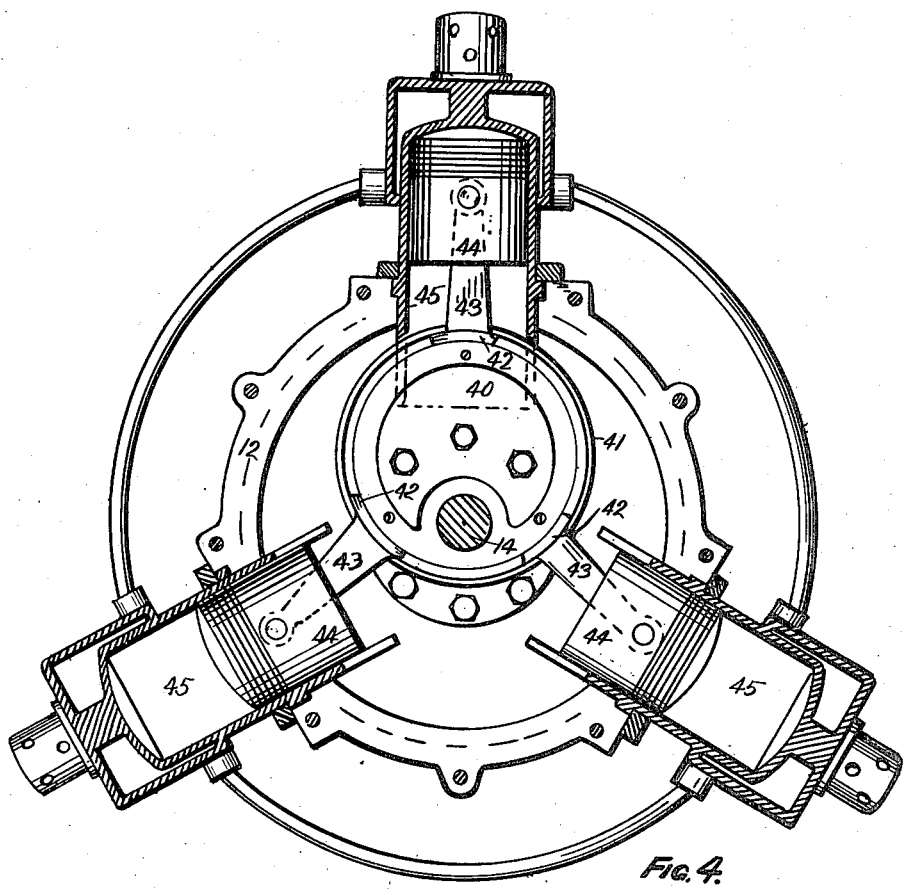
Figure 5:
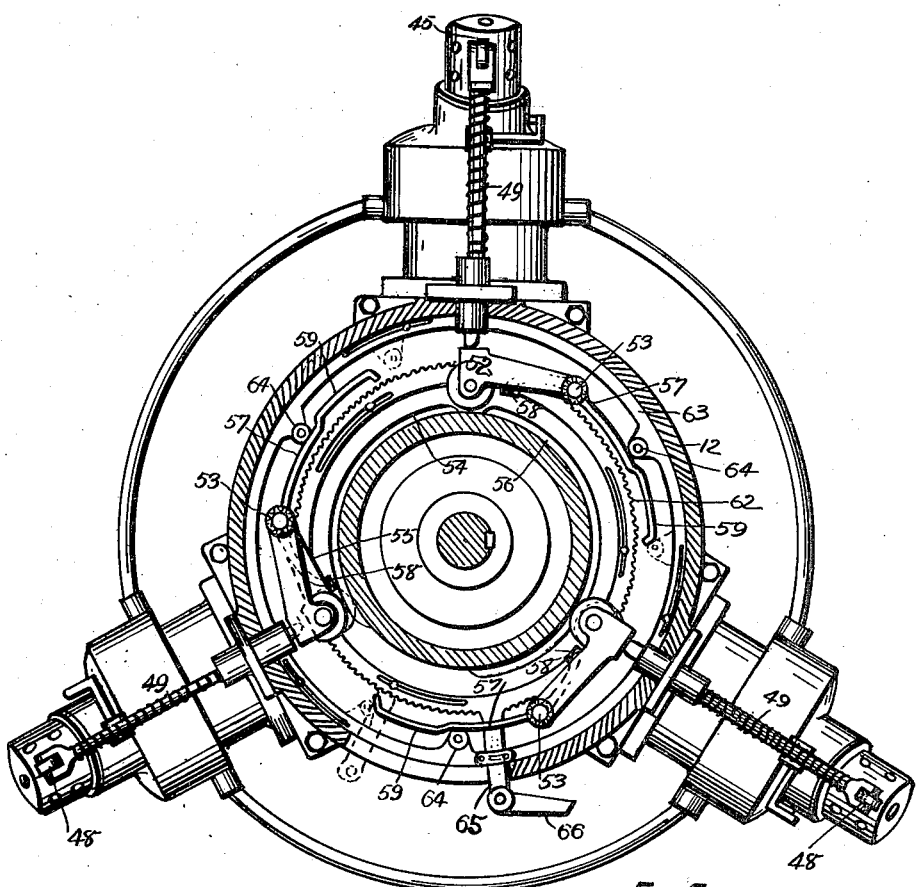
Figure 9:
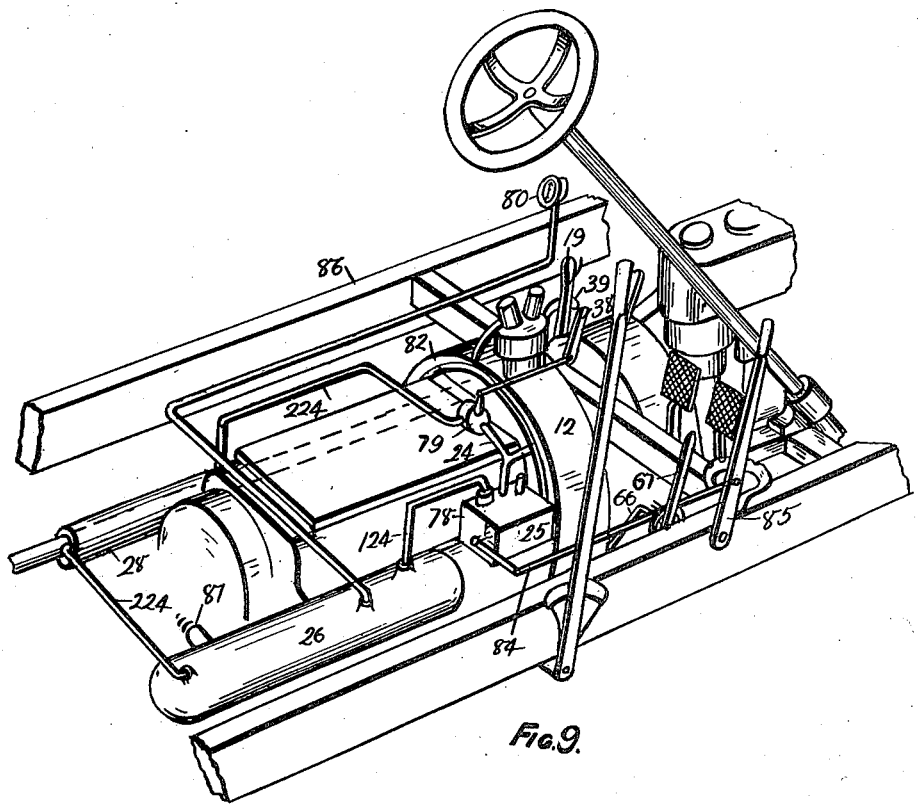

Figure 1 is a perspective view mainly diagrammatic of these present improvements applied to a railway automobile chassis and Fig. 2 is a plan of same. Fig. 3 is a central section of the pressure cylinders usably as a brake or a compressor or a motor and a clutch therefor set about a live axle or driving shaft. Figs. 4 and 5 are sectional elevations on the lines 4—4 and 5—5 respectively in Fig. 3. Figs. 6 and 7 are respective views in and out of gear respectively of the cam end of the valve motion of a pressure cylinder and Fig. 8 is a diagrammatic illustration of the operations of braking compressing and auxiliary power supplying. Fig. 9 a perspective view mainly diagrammatic of these present improvements applied to a road automobile and Fig. 10 a plan of same.

Figs. 1 and 2 show one method of applying the invention to a railway automobile and Figs. 3 to 8 show essential parts thereof in detail. The chassis 11 has all the usual motion imparting and controlling devices of an automobile as well understood. The casing 12 is supported upon cross bearers 13 and is positioned about a live axle or shaft 14 driven by gearing 15 from the wheel axle 16 whose speed is controlled by friction clutch 17 bell cranked rod 18 and handle 19. The driving motor or explosive engine 20 has clutch 21 gear box 22 gears 23 and controls adapted in any usual manner as well understood. The casing 12 contains pressure cylinders from which lead pipes 24 to the valve chest 25 and thence by pipe 124 to air reservoir 26. A pipe 224 leads from this reservoir back to the compressor 12 passing through the main engine silencer 28 in order that the air may be heated.

The live axle or shaft 14 (which as shown carries a clutch 21 which would be not always necessary or desirable save in an ordinary road automobile) has the inner or male member 30 of a friction clutch 17 slidably keyed upon it and adapted to be kept normally disengaged from the female member 31 of said clutch by spring 32 abutting against thrust ball bearing 33 and to be positioned in engagement with said outer clutch member 31 by bell cranks 34 operated by sliding head 35 controlled by fork 36 rod 18 and handle 19 and locking quadrant 39. The outer clutch member 31 is integral with or fast to an eccentric 40 whose strap 41 carries the ends 42 of the connecting rods 43 of the pistons 44 in pressure cylinders 45 firmly secured in or to the non-rotatable casing 12. Upon the outer end or head of each cylinder 45 are valves 46 and 47 which are intake and outlet valves respectively when the piston 44 is being used to compress air and vice versa when the cylinder 45 is being used as motor. Each valve 46 has an operative lever 48 jointed to spring controlled stem 49 terminating in a contact end and each valve 47 has an operative lever 50 jointed to spring controlled stem 51 and also terminating in a contact end. The contact end of each stem 49 presses upon a roller runner 52 fulcrumed on a pin 53 and adapted to contact with cam ring 54 while the contact end of each stem 51 presses upon a like roller runner 55 fulcrumed upon the same pin 53 and adapted to contact with a like cam ring 56. On the fulcrum pin 53 is a disengaging lever 57 having one end inwardly of the shank of the roller runners and with a cross piece 58 taking under both shanks of the pair of such runners 52 and 55 while the other end has an outwardly bent tail piece 59. The cam rings 54 and 56 are on the circular periphery of a drum formed with or on the outer clutch member 31.

The valves 46 and 47 require to be mechanically operated only when the cylinder is being used as a motor and are adapted to work automatically when the cylinder is used as a compressor. In order to accomplish this each fulcrum pin 53 has a quick pitch male screw 60 in a female screw in the casing 12 and a long fast pinion 61 in gear with the toothed wheel 62 forming part of circumferentially sliding ring 63 with pintles or triggers 64 and operative handle 65. Now as the ring 63 with the toothed wheel 62 is moved circumferentially by handle 65 each pintle or trigger 64 contacts with the tail 59 of the lever 57 and depresses it causing the cross piece 58 to lift the cam runners and thus free all the valves while at the same time the revolution of the pinion 61 and the screw 60 moves the cam runners 52 and 55 sidewardly clear of the cam ring 54 and 56. By oppositely sliding the ring 63 the valves are closed and the cam action for intermittently opening the valves is brought into function. The handle 65 has of course control by means of rod 66 from a convenient lever or handle 67.

The air reservoir 26 is conveniently positioned close by the casing 12 and its air pipe 24 (used both as supply and outlet pipe) leads from each cylinder valve 47 to the valve chest 25 in which is a slide valve 71 having ports 72 and 74 and a closing bar 73 and it slides above ports 75, 76 and 77 the pipe 24 entering the central one 76 while one of the other ports 75 connects by pipe to the atmosphere and the other 77 to the air reservoir by pipe 124 having a non return valve 78. Another pipe 224 leads to the cylinder valves 47 from the air reservoir with a control cock 79 thereon serving also as a non-return valve and this pipe 224 preferably passes through a heater as say the silencer 28 of a gas or explosive engine. The air reservoir has thereon a pressure gage 80 and a safety pressure valve 81 as well understood. The cock 79 has control rods 82 and gear to a convenient handle 83. The slide valve 71 is controlled by rod 84 and a lever handle 85 and when positioned as shown in Fig. 9 with a control cock 79 closed, directs the compressed air from the cylinders by the pipes 24 by port 72 and 74 and pipe 124 to the reservoir 26 and by port 72 to the atmosphere. Sliding the valve downwardly (relatively to the drawing) will close ports 72 and 76 and control cock 79 being opened compressed air from reservoir 26 will pass along pipe 224 being heated and expanded at heater 28 and the valve motion being in gear as before explained the cylinders will act as engines and revolve the live axle or shaft 14. Sliding the valve farther downwardly the ports 76 and 77 will be opened while port 75 to the atmosphere will be closed and control cock 79 being closed and the valve motion disallowed to operate as before described the cylinders will operate as compressors and force air into the reservoir 26 through pipes 24 and 124 as well as braking the shaft 14.

Figure 10:
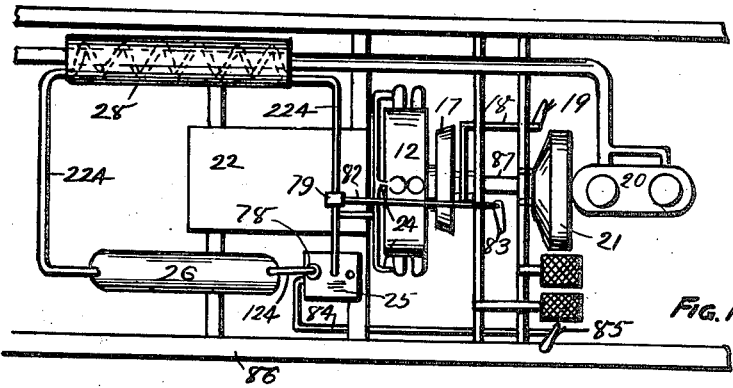

Figs. 9 and 10 show these improvements fitted upon an automobile chassis 86 and in this case the casing 12 is fitted about and the cylinder parts geared to a continuation of the gear box main shaft 87 which connects to the crank shaft of the main engine by a clutch as well understood.

In operation the whole of the described mechanism may be disregarded and be placed out of operation as desired by disengaging the male member 30 from the female member 31 of the clutch. In use as a brake when the shaft has too much momentum the clutch members 30 and 31 are engaged and the eccentric 40 thus caused to reciprocate the pistons 44. Air is drawn in through the open valve 46 and expelled through the open valve 47 along pipe 24 through slide valve chest 25 along pipe 124 to reservoir 26 or to the atmosphere through port 75 as desired. While this action is taking place the back pressure in the cylinders acts as a load on the axle and is a partially effective brake but when it is required in an emergency as an effective brake by closing the end of pipe 24 and the port 75 by the slide valve the whole pressure in the cylinders may be utilized upon the live axle and it be quickly brought to a standstill. In order to utilize the described mechanism as an auxiliary driving power on the live axle or shaft the slide valve is operated as before described and the valve motion put in function and thus the compressed air in reservoir 26 conducted through the heater 28 is used as the motive power upon the pistons 44 in the pressure cylinders converting these into a motor driving the shaft 14 by means of piston rods 43 eccentric 40 and clutch members 30 and 31.

What I claim as my invention, and desire to secure by Letters Patent is—

1. In mechanism of the class described, in combination, a vehicle axle, a cylinder, a piston within said cylinder and operatively connected to said axle, a reservoir, connections between said reservoir and said cylinder, valves in said cylinder adapted to act automatically to cause said piston to force air into said reservoir, and means for positively actuating said valves by the rotation of said axle, whereby the piston will be driven by the compressed air from the reservoir.

2. In mechanism of the class described, in combination, a vehicle axle, a clutched member slidingly keyed thereto, a second clutch member loosely mounted on said axle and adapted to be engaged by said sliding clutch member, an eccentric secured to said second clutch member, a cylinder, a piston therein operatively connected to said eccentric, valves in said cylinder a reservoir, connections between said cylinder and said reservoir, said valves operating automatically to cause said piston to force air into said reservoir and means for positively actuating said valves by the rotation of said axle, whereby the piston will be driven by the compressed air from the reservoir.

In testimony whereof I have signed my name to this specification in the presence of two subscribing witnesses.

ALBERT ERNEST WILFORD FINCH.

Witnesses:
 FRED WALSH,
 PERCY NEWELL.